United States Patent [19]

Matsumoto

[11] Patent Number: 4,670,776

[45] Date of Patent: Jun. 2, 1987

[54] CHROMINANCE SIGNAL PROCESSING SYSTEM

[75] Inventor: Tokikazu Matsumoto, Osaka, Japan

[73] Assignee: Matsushita Electric Industrial Co., Ltd., Osaka, Japan

[21] Appl. No.: 741,234

[22] Filed: Jun. 4, 1985

[30] Foreign Application Priority Data

Jun. 8, 1984 [JP] Japan .................. 59-118512

[51] Int. Cl.⁴ .................................. H04N 9/64
[52] U.S. Cl. ............................ 358/40; 358/19
[58] Field of Search ............. 358/40, 19, 150; 331/1 A; 375/120

[56] References Cited

U.S. PATENT DOCUMENTS

| | | | |
|---|---|---|---|
| 4,291,332 | 9/1981 | Kato | 375/120 |
| 4,376,268 | 3/1983 | Moriya | 375/120 |
| 4,458,356 | 7/1984 | Toy | 375/120 |
| 4,523,150 | 6/1985 | Hogeboom | 375/120 |
| 4,523,223 | 6/1985 | Luder | 358/40 |
| 4,527,145 | 7/1985 | Haussmann | 358/19 |

*Primary Examiner*—Michael A. Masinick
*Attorney, Agent, or Firm*—Wenderoth, Lind & Ponack

[57] ABSTRACT

A chrominance signal processing system includes an A/D converter for converting an analog video signal including a carrier chrominance signal into a digital signal and a frequency controlable variable frequency oscillator for generating a clock to be fed to the A/D converter and a phase comparator for comparing the phase of the output of the A/D converter with the phase of the clock and a computing circuit for computing the absolute value and sign of the output signal of the phase comparator during a burst period. The system further includes two current sources of a current outflow type and a current influx type, having current values which are controlled by the absolute value output of the computing circuit and are turned on/off respectively by the sign output of the computing circuit, the output terminals of the two current sources being connected to each other and the outputs of the current sources controlling the variable frequency oscillator through a low pass filter.

1 Claim, 8 Drawing Figures

CHROMINANCE SIGNAL PROCESSING SYSTEM

BACKGROUND OF THE INVENTION

1. Field of the Invention

The present invention relates to a chrominance signal processing system such as an automatic phase control circuit (hereinafter to be referred to as an APC circuit) to obtain signals which are synchronous with the burst signal of an input carrier chrominance signal for use in a video tape recorder and the like.

2. Description of the Prior Art

Recently, there have been increasing demands to process the video signals including the chrominance signal to be used in a video tape recorder and the like in the form of a digital signal. In so doing, in order to obtain a clock which is synchronous with the burst signal, an APC circuit is used.

With reference to the drawings, description will be made on the conventional APC circuit hereunder. FIG. 1 is a block diagram to show the conventional APC circuit used for processing the chrominance signal in a digital signal form. In the figure, a video signal including the chrominance signal, inputted from an input terminal 1, is converted into a digital signal by an A/D (analog/digital) converter 2. This digital signal is outputted from an output terminal 3, and simultaneously inputted to a phase comparator 4 where its phase is compared with the output of a VCO (voltage controlled oscillator) 8.

Then, the output of the phase comparator 4 passes through a switch circuit 5 which is closed only for the burst period, and filtered by a low-pass filter 9 constituted by resistors $R_1$, $R_2$, a capacitor C and an operational amplifier 7 to control the VCO 8. The output of the VCO 8 is sent to the A/D converter 2 as a clock, and as a result, the input signal from the input terminal 1 is subjected to A/D conversion by a clock which is synchronous with the burst signal.

However, in the constitution such as above, there has been a defect in that, because the phase difference between the output of the VCO 8 and the burst signal is determined by the voltage of a voltage source 6 connected to the positive input terminal of the operational amplifier 7, the above phase difference fluctuates with the variation of the voltage of the voltage source 6. This is because of the fact that since the low-pass filter 9 filters the difference between the voltage of the voltage source 6 and the output of the phase comparator 4 which has passed through the switch circuit 5, unless the voltage to be outputted from the phase comparator 4 at the time when the phase difference is zero is equal to the voltage of the voltage source 6, feedback is not applied so that the phase difference between the two signals to be compared by the phase comparator 4, i.e., the phase difference between the burst signal and the output of the VCO 8, becomes zero.

SUMMARY OF THE INVENTION

An object of the present invention is to provide a chrominance signal processing system, or an APC circuit, wherein the phase difference between the clock, which is necessary for the A/D conversion of the video signal including the chrominance signal and is synchronous with the burst signal, and the burst signal is always kept zero, without being dependant on the variation of the circuit constant of the analogous circuit.

The chrominance signal processing system of the present invention, which performs a control in such a manner to make the phase difference between the burst signal and the clock always zero, comprises: an A/D converter for effecting analog/digital conversion of a video signal containing a carrier chrominance signal; a frequency controllable variable frequency oscillator for generating a clock to be fed to said A/D converter; a phase comparator for comparing the output of said A/D converter with the phase of said clock; a computing circuit for computing the absolute value and sign of the output signal of said phase comparator during a burst period; and two current sources of current outflow type and current influx type, whose current values are controlled by the absolute value output of said computing circuit and turned on/off respectively by the sign output of said computing circuit, wherein output terminals of said current outflow type current source and said current influx type current source are connected to each other, and outputs of said current sources control said variable frequency oscillator through a lowpass filter.

DESCRIPTION OF THE PREFERRED EMBODIMENT

Figure 1:
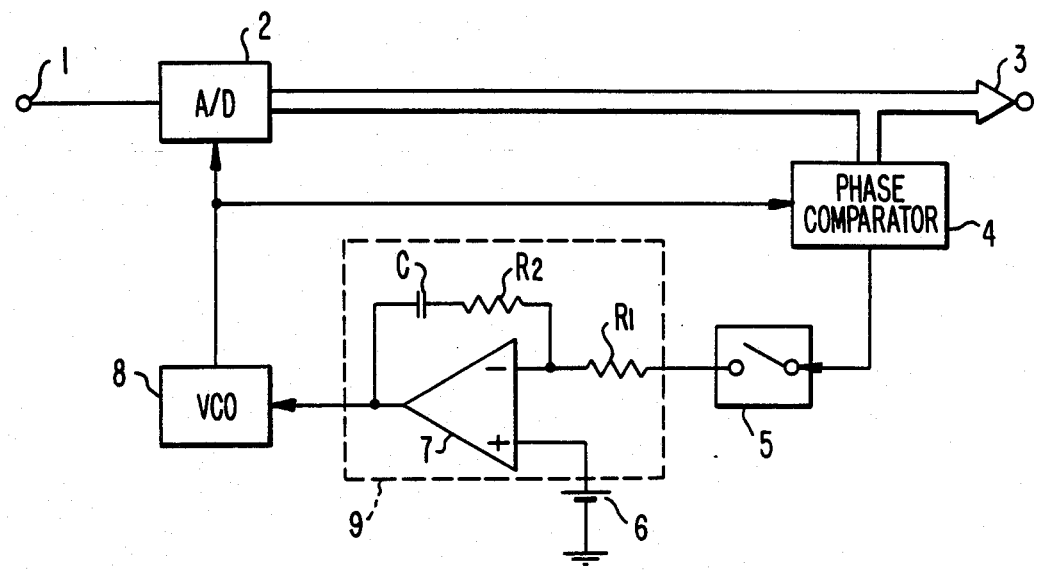
FIG. 1 is a block diagram used to show the conventional APC circuit constitution.
Figure 2:
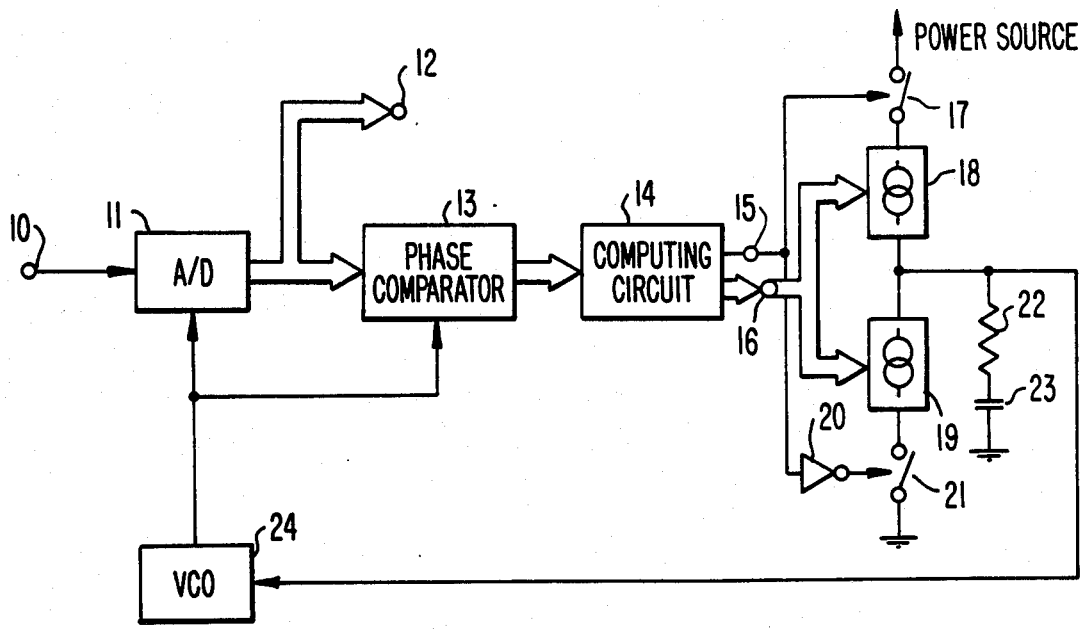
FIG. 2 is a block diagram used to show the constitution of a preferred embodiment of the present invention.

The present invention will hereinafter be described with reference to the drawings. FIG. 2 is a block diagram used to show an embodiment of an APC circuit according to the present invention. In the figure, a video signal including a chrominance signal inputted from an input terminal 10 is subjected to A/D conversion by an A/D converter 11. The converted signal is outputted from an ouput terminal 12, and, at the same time, sent to a phase comparator 13.

The phase comparator 13 compares the phase of the output of the A/D converter 11 with that of the output of a VCO 24, and its output is sent to a computing circuit 14. The computing circuit 14 extracts the output signal of the phase comparator 13 during a burst period, computes the sign and the absolute value of the signal, and outputs the sign as a binary signal to a terminal 15 and the absolute value as digital data to a terminal 16. The absolute value outputted to the terminal 16 is sent to current-controllable current sources 18 and 19, and controls their current values. The current sources 18 and 19 are respectively the current outflow type current source and the current influx type current source, whose current values are to be determined by the digital data. Such current sources can be realized, for example, by being constituted as to have internal plural current sources of different current values which are selectable by the digital data.

On the other hand, the sign obtained at the terminal 16 opens or closes the switch circuit 17, and opens or closes the switch circuit 21 through an inverter 20. As a result, for example, when the phase of the burst signal is advanced relative to the phase of the output of the VCO 24, the switch 17 is closed, and the current proportional to the phase difference flows into a capacitor 23 through a resistor 22 from an electric power source by the current source 18, so that the potential of the capacitor rises. Conversely, when the phase of the burst signal is delayed relative to the phase of the output of the VCO 24, the switch 21 is closed, and the current proportional to the phase difference flows out to the ground through the resistor 22 from the capacitor 23 by the current source 19, so that the potential of the capacitor 23 drops. This potential of the capacitor 23 controls the VCO 24 through the resistor 22 to form a negative feedback loop to make the phase difference between the burst signal and the output signal of the VCO 24 equal to zero. Here, the capacitor 23 and the resistor 22 correspond to the low-pass filter 9 in the conventional embodiment. In the present embodiment, when there is a fluctuation of an analogous circuit constant, e.g., even if a change has occurred in the current values with respect to a certain digital data in the current sources 18 and 19, the actions in which the current flows into the capacitor 23 when the phase of the burst signal is advanced relative to the phase of the output of the VCO 24 and flows out in the opposite case are exactly performed, so that the phase difference between the burst signal and the output signal of the VCO 24 is kept zero.

Figure 3A:
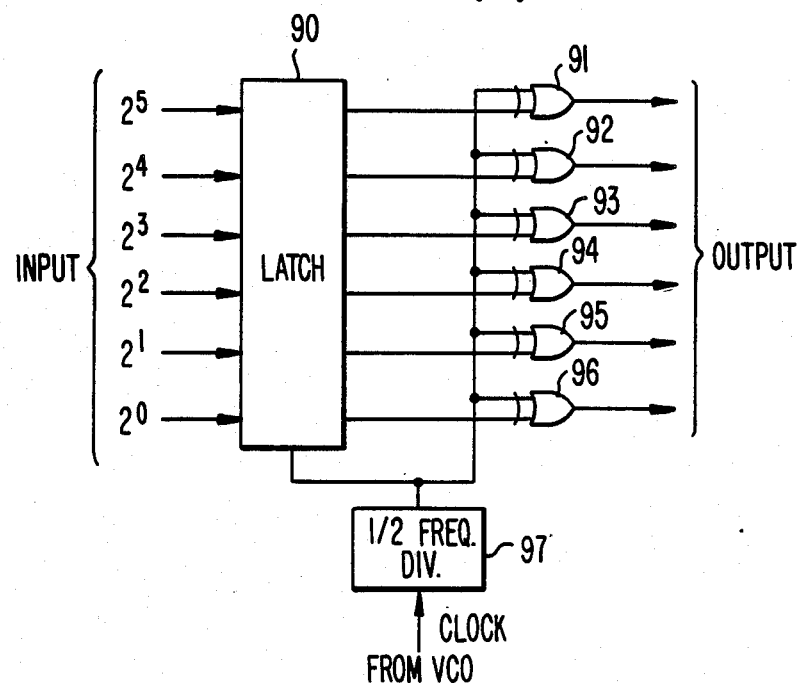
FIGS. 3 (a) to 3(d) are a circuit diagram and working waveform diagrams used to show an embodiment of the phase comparator used in the embodiment of FIG. 2.
Figure 3B:
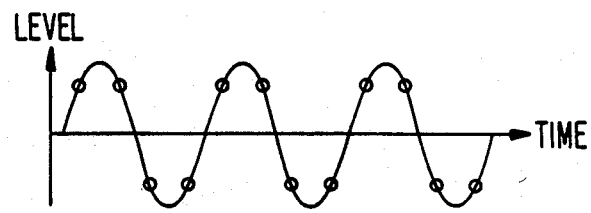
Figure 3C:
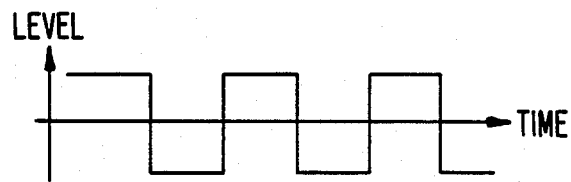
Figure 3D:
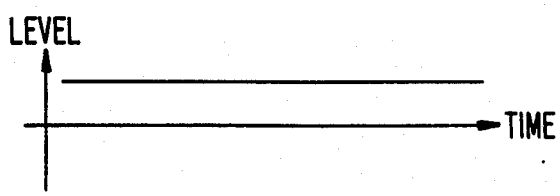

Next, substantial constitutions of the phase comparator 13, computing circuit 14 and current sources 18, 19 in the present embodiment will be explained with reference to FIGS. 3(a)–(d), FIG. 4 and FIG. 5, respectively. FIG. 3(a) shows an embodiment of the phase comparator. In this embodiment, an explanation is given for the case where the quantizing bit number is 6 bits and the sampling frequency is four times the chrominance signal. FIG. 3(b) shows a state where the chrominance signal is sampled, wherein the circle marks show the sampling points. As such, when the sampled signals are latched by a latch 90 every other sample, a signal as shown in FIG. 3(c) is obtained. The latch pulse is obtained by dividing the clock generated by the VCO in half with a ½ divider 97. When the output of the latch 90 is reversed every other clock by EX-OR circuits 91–96, a direct current level representing the phase difference between the sampling clock and the chrominance signal as shown in FIG. 3(d) is obtained.

Figure 4:
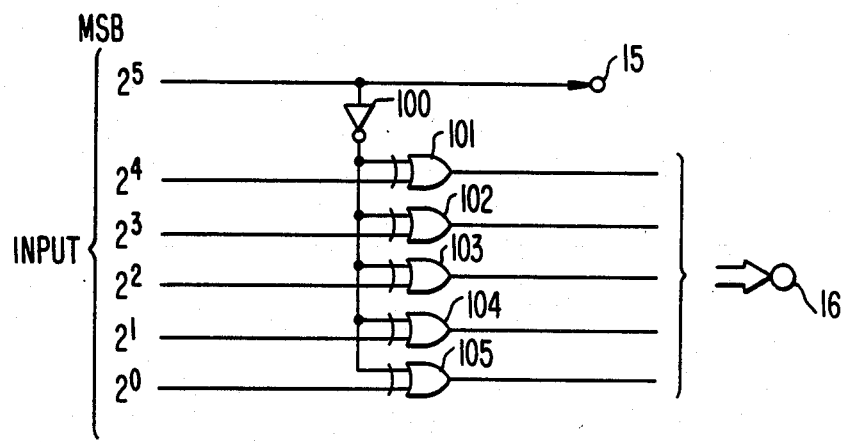
FIG. 4 is a circuit diagram used to show an embodiment of the computing circuit used in the embodiment of FIG. 2.

FIG. 4 shows an embodiment of the computing circuit. The elements 101–105 are EX-OR circuits, and the element 100 is an inverter. By reversing each bit lower than the MSB according to the sign of the MSB, an absolute value can be obtained. The MSB is used as a sign bit.

Figure 5:
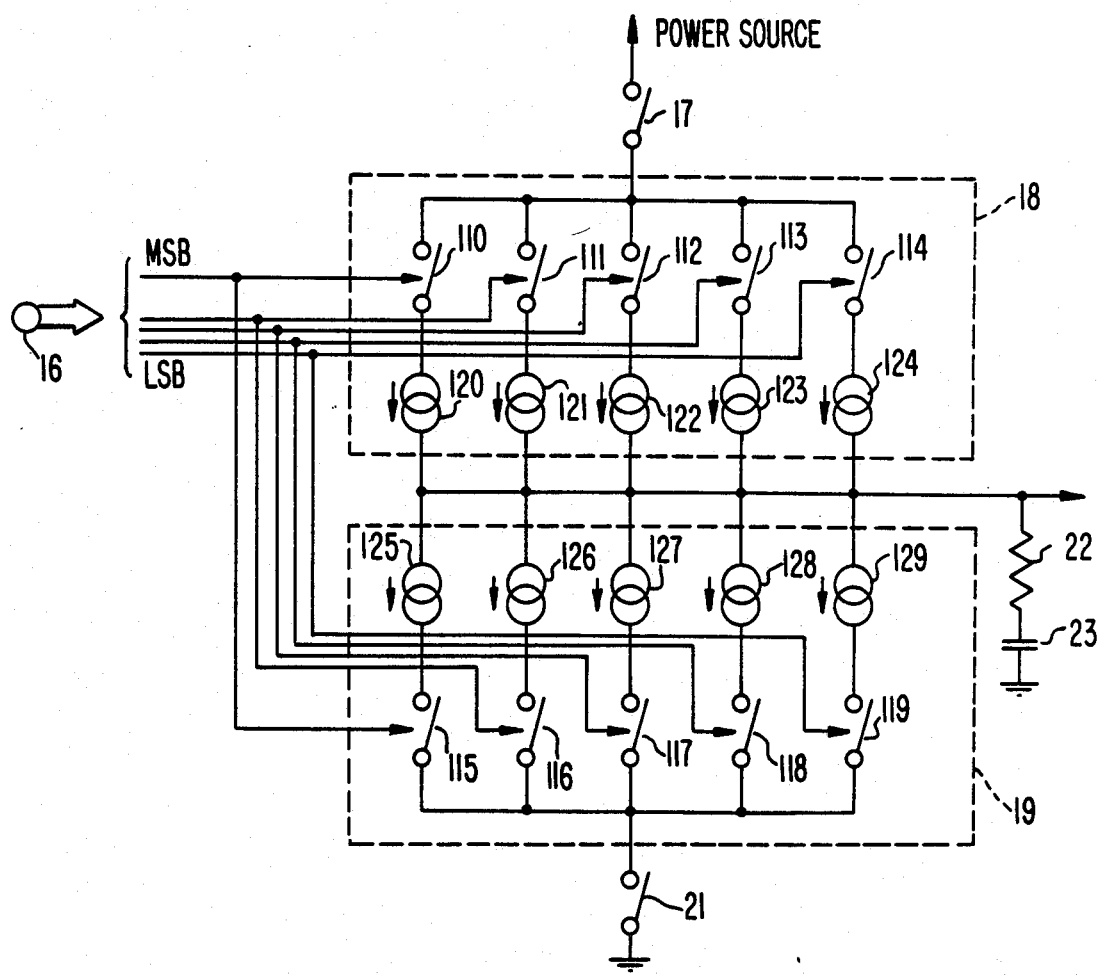
FIG. 5 is a circuit diagram used to show an embodiment of the current source used in the embodiment of FIG. 2.

FIG. 5 shows an embodiment of the current sources 18 and 19. The current source 18 is constituted by current sources 120–124 and switches 110–114. The current source 19 is constituted by current sources 125–129 and switches 115–119. The ratios of the current values of the current sources 120, 121, 122, 123 and 124 are 16:8:4:2:1, and the ratios of the current values of the current sources 125, 126, 127, 128 and 129 are 16:8:4:2:1. Accordingly, when each current source is controlled by the absolute values obtained from the above explained computing circuit by the use of its corresponding switch, it is possible to have the current proportional to the absolute value flow into or flow out from the resistor 22 and the capacitor 23.

The phase comparator, computing circuit, and current sources as explained above are given as examples only, and it is to be understood that various other constitutions are possible by the known techniques.

What is claimed is:

1. A chrominance signal processing system comprising:

an A/D converter for effecting an analog/digital conversion of a video signal including a carrier chrominance signal;

a frequency controllable variable frequency oscillator for generating a clock to be fed to said A/D converter;

a phase comparator for comparing the phase of the output of said A/D converter with the phase of said clock, a computing circuit for computing the absolute value and sign of the output signal of said phase comparator during a burst period; and two current sources of a current outflow type and a current influx type, having current values which are controlled by the absolute value output of said computing circuit and are turned on/off respectively by the sign output of said computing circuit, wherein output terminals of said current outflow type current source and said current influx type current source are connected to each other, and outputs of said current sources control said variable frequency oscillator through a low-pass filter.

* * * * *